(12) United States Patent
Niehaus et al.

(10) Patent No.: US 12,430,538 B2
(45) Date of Patent: Sep. 30, 2025

(54) SYSTEM AND METHOD FOR THE QUALITY ASSURANCE OF DATA-BASED MODELS

(71) Applicant: AICURA MEDICAL GMBH, Berlin (DE)

(72) Inventors: Sebastian Niehaus, Buxtehude (DE); Michael Diebold, Berlin (DE); Janis Reinelt, Leipzig (DE); Daniel Lichterfeld, Berlin (DE)

(73) Assignee: AICURA MEDICAL GMBH, Berlin (DE)

( * ) Notice: Subject to any disclaimer, the term of this patent is extended or adjusted under 35 U.S.C. 154(b) by 750 days.

(21) Appl. No.: 17/788,025

(22) PCT Filed: Dec. 23, 2020

(86) PCT No.: PCT/EP2020/087822
§ 371 (c)(1),
(2) Date: Jun. 22, 2022

(87) PCT Pub. No.: WO2021/130340
PCT Pub. Date: Jul. 1, 2021

(65) Prior Publication Data
US 2023/0023058 A1    Jan. 26, 2023

(30) Foreign Application Priority Data

Dec. 23, 2019    (EP) .................................. 19219525.3
May 25, 2020    (EP) .................................. 20176326.5

(51) Int. Cl.
*G06N 3/045*    (2023.01)
*G06N 3/088*    (2023.01)

(52) U.S. Cl.
CPC ............. *G06N 3/045* (2023.01); *G06N 3/088* (2013.01)

(58) Field of Classification Search
CPC .............................. G06N 3/045; G06N 3/088
See application file for complete search history.

(56) References Cited

U.S. PATENT DOCUMENTS

2017/0372155 A1*    12/2017    Odry ...................... G06F 18/28
2018/0307912 A1*    10/2018    Selinger ................ G06V 20/41
(Continued)

OTHER PUBLICATIONS

Intrator et al. "MDGAN: Boosting Anomaly Detection Using Multi-Discriminator Generative Adversarial Networks," arXiv: 1810.05221, Oct. 2018, 8 pages [retrieved online from: https://arxiv.org/pdf/1810.05221].

(Continued)

*Primary Examiner* — David E Choi
(74) *Attorney, Agent, or Firm* — Sheridan Ross PC (57) ABSTRACT

The invention relates to a system which, on the one hand, has a classifier that is formed by a discriminative neural network and that implements a binary class model or a multi-class model. On the other hand, the system has a model-based sample generator that is formed by a generative neural network. Both the classifier and the model-based sample generator are trained—for a corresponding class—with the same training data records and therefore embody models that correspond to one another for this class.

The invention also relates to a method for determining a quality criterion for input data records for a classifier with a discriminative neural network. The classifier has been trained with training data records and represents a classification model for a class.

According to the method, a model-based sample generator with a generative neural network is initially provided and trained with the same training data records that were used to train the classifier.

Subsequently, by means of the trained model-based sample generator and an input data record based on random values, (Continued)

an artificial data record is generated, which is representative of the classification model embodied by the classifier.

The artificial data record generated by the trained generator, or at least a parameter derived from it, is used to test the input data records as to their suitability for classification or regression.

14 Claims, 7 Drawing Sheets

(56) References Cited

U.S. PATENT DOCUMENTS

| | | | |
|---|---|---|---|
| 2020/0245885 A1* | 8/2020 | Haeusser | A61B 5/055 |
| 2020/0335083 A1* | 10/2020 | Wan | G06N 3/044 |
| 2021/0156708 A1* | 5/2021 | Wojcik | G01C 21/3697 |

OTHER PUBLICATIONS

Official Action with English Translation for European Patent Application No. 20176326.5, dated Jun. 28, 2024, 18 pages.
Ferdowsi et al. "Brainstorming Generative Adversarial Networks (BGANs): Towards Multi-Agent Generative Models with Distributed Private Datasets," arXiv.org, Feb. 2, 2020, arXiv:2002.00306, 12 pages.
Hardy et al. "MD-GAN: Multi-Discriminator Generative Adversarial Networks for Distributed Datasets," IEEE, 2019 IEEE International Parallel and Distributed Processing Symposium (IPDPS), May 2019, pp. 866-877.
Li et al. "Sparsely Self-Supervised Generative Adversarial Nets for Radio Frequency Estimation," IEEE Journal on Selected Areas in Communications, Nov. 2019, vol. 37, No. 11, pp. 2428-2442.
McDuff et al. "Characterizing Bias in Classifiers using Generative Models," arXiv.org, May 30, 2019, arXiv:1906.11891v1, 11 pages.
Schlegl et al. "Unsupervised Anomaly Detection with Generative Adversarial Networks to Guide Marker Discovery," arXiv.org, Mar. 17, 2017, arXiv:170305921, 12 pages.
Song et al. "Loosely Coupled Federated Learning Over Generative Models," arXiv.org, Sep. 28, 2020, arXiv:2009.12999, 10 pages.
Zhong et al. "Transfer Learning Based on Joint Feature Matching and Adversarial Networks," Journal of Shanghai Jiao Tong University, 2019, vol. 24, No. 6, pp. 699-705.
Extended Search Report with machine translation for European Patent Application No. 20176326.5, dated Nov. 11, 2020, 25 pages.
International Search Report and Written Opinion for International (PCT) Patent Application No. PCT/EP2020/087822, dated Apr. 6, 2021, 20 pages.
English Translation of the International Search Report for International (PCT) Patent Application No. PCT/EP2020/087822, dated Apr. 6, 2021, 2 pages.

\* cited by examiner

SYSTEM AND METHOD FOR THE QUALITY ASSURANCE OF DATA-BASED MODELS

CROSS REFERENCE TO RELATED APPLICATIONS

This application is a national stage application under 35 U.S.C. 371 and claims the benefit of PCT Application No. PCT/EP2020/087822 having an international filing date of 23 Dec. 2020, which designated the United States, and which PCT application claimed the benefit of European Patent Application No. 19219525.3 filed 23 Dec. 2019, and European Patent Application No. 20176326.5 filed 25 May 2020, the contents of each of which are incorporated herein by reference in their entireties.

The invention relates to a system and a method for quality assurance of data-based models.

The invention relates in particular to a system and a method for quality assurance of classifiers or regressors formed by discriminative neural networks, wherein the classifiers serve to determine the membership or non-membership of objects, states or events represented by a respective input data record with one class or one of several classes. Regressors, on the other hand, output a numeric value, e.g. age information for a person, when the regressor processes an image of a person.

For example, binary classifier units are known which, for an object, event or state represented by a respective data record, indicate the membership or non-membership of this object, this state or this event with a class for which the binary classifier unit is trained.

An input data set is typically a vector or a matrix. If an object is represented by a vector, for example, the vector contains values that describe certain properties of the object, for example a value for the property weight, a value for the property size, and a value for the property gender. A corresponding vector could look like this for a male person who is 1.90 m tall and weighs 100 kg, for example: (2,190,100). In this vector, for example, 2 represents the gender (1=female, 2=male), 190 represents the height of 190 cm, and 100 the body weight, namely 100 kg.

A neural network is typically structured in such a way that there is an input node for each value, i.e. three input nodes in the example mentioned, of which one input node is provided for the gender, a second input node for the height, and a third input node for the weight. The latter, however, does not apply to so-called LSTM neural networks (LSTM: long short-term memory).

The values contained in an input data record are assigned to the (input) nodes of the input layer. The input nodes supply their output values as input values to typically several (or all) nodes of the next layer of the artificial neural network. An (output) node in an output layer of the artificial neural network finally supplies the membership value that indicates the probability that (or whether) an object, event or state represented by the input data record belongs to a certain class. Typically, several intermediate layers (hidden layers) are provided between the input layer and the output layer; together with the input layer and the output layer, they define the topology of the neural network. A binary classifier can have two nodes in the output layer, namely one that supplies the membership value for the class A and one that supplies the membership value for the class not-A as the output value. A multi-class classifier can have several nodes in the output layer, namely one that supplies a membership value for one of the classes for which the multi-class classifier was trained, and another node that indicates the probability that the object represented by the input data record or the state represented by the input data record is not to be assigned to any of the classes for which the multi-class classifier was trained. A multi-class classifier can be formed by several binary sub-classification models in such a way that the multi-class classifier is composed of several parallel binary sub-classification models (that form binary sub-paths), each with their own intermediate layers (hidden layers), wherein the several parallel binary classification models have a common input layer and a common output layer.

In typical artificial neural networks, an input layer with its input nodes is thus followed by several other layers (hidden layers) with nodes. In this case, each node of a subsequent layer is typically linked to all nodes of the previous layer and can thus receive the respective output values of the nodes of the previous layer. The values received in this way are typically summed up in a weighted manner in a respective node in order to then form an output value of the respective node from the weighted sum, for example via a sigmoid function or another activation function, which is then output to all nodes of the next layer. The number of layers and nodes make up the topology of a neural network. The function with which a respective node weights the typically different input values from the nodes of the previous layer and processes them into an output value makes up the parameterization of the artificial neural network and defines a model, e.g. a classification model. The parameterization with regard to the weights used for weighting the input values of the individual nodes takes place during the training of the artificial neural network with training data records.

As is generally known, the individual weights are created in the course of a training phase for a respective artificial neural network. In such a training phase, training data records, and typically also the class (called label or target) belonging to a respective training data record, are made available to the artificial neural network as input data records. During the training phase, the deviation of the output value of the nodes at an output layer of the neural network from the expected value is determined regularly.

For example, an artificial neural network that represents a binary classification model (a binary classifier) has exactly two nodes in the output layer, of which one node supplies a membership value in the result that represents the probability that the input data record belongs to a specific class, while the other node supplies a membership value which indicates the probability that the input data record does not belong to this class. The membership values do not necessarily have to be unique, but rather indicate a probability that, for example, the object represented by the input data record belongs to class A or not to class A. A possible membership value can thus be 0.78, for example, and mean that there is a 78% probability that the object belongs to class A and a 22% probability that it does not belong to class A.

During the training or learning phase for an artificial neural network, the difference between the expected output values of the artificial neural network and the actual output values of the artificial neural network is determined and, based on this error given by a difference, the weights of all nodes and node inputs are iteratively changed until the values obtained at the output layer of the artificial neural network approximately correspond to the expected values. In this process, the weights are gradually adapted backwards, so to speak, starting from the output layer through all preceding layers up to the input layer. During the learning phase, the weights are optimized step by step in an iterative process in such a way that the deviation between a specified target value (i.e. a specified class, also called label or target) and the output value of the classifier is as small as possible. The deviation between the specified target value and the output value of the classifier can be assessed using a quality criterion, and the weights can be optimized using a gradient algorithm in which a typically quadratic quality criterion is optimized, i.e. the minima of the quality criterion are searched for. A minimum is approximated by means of a known gradient algorithm that determines the gradients by which the weights change from iteration step to iteration step. Larger gradients correspond to a larger change per iteration step and small gradients correspond to a smaller change per iteration step. In the vicinity of a searched for (local) minimum of the quality criterion, the changes in the weights from iteration step to iteration step—and thus the corresponding gradient—are typically relatively small. The gradients can be used to determine respective weight changes for the next iteration step. The iterative optimization is continued until a specified abort criterion is met, e.g. the quality criterion has reached a specified level, or a defined number of iteration steps has been reached.

Since the values in the input data records can be different for different states or objects of the same class, a classifier is trained with a plurality of more or less different input data records as training data records for a respective class, and the model parameter values are determined in the course of the optimization process in such a way that they provide a possible reliable membership value for a respective class in spite of deviating input data records. For example, if a specified class for an object is "rose" and the values of the input data record represent the pixels of a photo—namely color and brightness of a respective pixel in the photo—the color of the rose petals is obviously less important than, for example, their shape in order to assign the object shown in the photo to the "rose" class. The training of a respective classifier with many different photos of roses will likely lead to the result that values of the input data records that are dependent on the color of the petals are weighted less than values of the input data records that are dependent on the shape of the petals, which leads to correspondingly adapted model parameter values, especially weighting for the various input values of the nodes.

The reliability with which such an artificial neural network, as a classifier, can assign objects, events or states represented by input data records to one or more classes is thus largely dependent upon the input data records that were used as training data records during the training phase of the artificial neural network.

The same also applies if the input data records are not vectors but, for example, matrices that can represent recorded images, for example. Such matrices, i.e. images for example, are typically processed using convolutional artificial neural networks (CNN) in which the dimensions of the input matrix are gradually reduced by means of convolution layers, wherein a respective input matrix (on the input level as well as on the subsequent levels) is convoluted by means of smaller convolution matrices serving as filters (for example 3×3 matrices, which are also referred to as filter kernels). In this process, the filter kernel is shifted line by line for the respective input matrix. The input values of a respective node of a (convolution) layer following the convolution layer are thus determined by means of discrete convolution. The input values of a node in the convolution layer are calculated as the inner product of the convolution matrix (filter kernel) with the values of the input matrix currently assigned in a respective step. The comparatively small convolution matrix is moved over the relatively larger input value matrix step by step, so to speak, and the inner product is formed in each case. This is shown quite clearly in https://de.wikipedia.org/wiki/Convolutional_Neural_Network. After a corresponding input matrix has been sufficiently reduced, its values can be processed further by a fully connected artificial neural network (similar to a perceptron) on the subsequent levels in order to classify the images represented by the input matrices, for example.

In the case of a regressor based on a neural network, this regressor can be trained to e.g. output a number for an input data record representing an image, with this number representing the age of the person whose picture was taken, for example In this case as well, the quality of the classification or the regression depends on the input data records (matrices, for example images) that were used to train the corresponding convolutional neural network.

Known problems, such as overfitting, can result in a discriminative neural network used as a classifier not reliably classifying certain input data records if the input data records deviate too much from the training data records. For example, if the input data records used for training are too similar or if too few input data records representing different variants of the same object or state are available for training, the known overfitting can occur. If, for example, a classifier unit for the object "rose" was only trained with photos of red roses, it is quite possible that such a classifier unit only determines a low membership value for photos of white roses, although white roses are roses just like red roses.

The object of the invention is to provide a means of determining the reliability of an artificial neural network with regard to various input data records occurring in practice in order to be able to specify the conditions under which, for example, reliable classifications can be expected from a classifier and under which conditions a classification by the classifier is potentially incorrect.

For example, input data records can represent images, tomographies or three-dimensional models that have been obtained using imaging techniques in medical technology. In this case, the input data records can be very different, depending on how the respective images were taken or the models were created. The differences can result, for example, from the values of the technical parameters that were used in the creation of the image or the modeling. These technical parameters whose values influence the properties of the input data records are, in imaging or tomographic methods, for example the contrast range, the image distance, the reconstructed slice thickness, the reconstructed volume or the like.

The invention proposes a system for this purpose which, on the one hand, has a classifier that is formed by a discriminative neural network and that implements a binary class model or a multi-class model. The system also has a model-based sample generator that is formed by a generative neural network. Both the classifier and the model-based sample generator are trained—for a corresponding class—with the same training data records and therefore embody models that correspond to one another for this class.

The classifier and the model-based sample generator can be spatially separated from one another. In particular, the classifier can be operated in a confidential environment, while the model-based sample generator does not have to be, since no confidential data has to be supplied to the model-based sample generator.

A regressor can also be provided instead of a classifier. In this case, the model-based sample generator is also trained with the same training data records as the regressor.

A generative neural network (a generator) uses a random input data record, for example an input data record that represents noise, to generate an artificial data record that represents an artificial object, an artificial state or an artificial event and that corresponds to an input data record for a classifier, for example. For example, a generative neural network (a generator) can generate a data record that represents an image of an object from a matrix that represents noise. This is the case if the generative neural network has been trained using training data records with corresponding images of the object. This applies in particular to deconvolutional generative networks that have corresponding layers, which gradually process a small random input matrix into a larger output matrix as the output data record. This then represents e.g. an artificially created image of an object.

A generative neural network can, however, also be set up in the manner of a perceptron, which is formed by fully connected layers and has a comparatively large input layer and an output layer of the same size (i.e. having the same number of nodes) and several hidden layers that gradually get smaller initially and then larger again. This kind of generative network can be supplied with a random vector at the input layer, and then supplies a vector as an output value that represents a certain object, a certain state, or a certain event.

An autoencoder is a preferred variant of a generative neural network for the application described here, in particular for determining a quality criterion.

In order to train the generative neural network—i.e. the model-based sample generator—an instance is provided that can determine the deviation of a generative model, represented by the model-based sample generator, from the training data records so that the deviations can be minimized within the scope of training. This instance can be a loss function that determines a similarity loss, for example. However, the instance determining the deviation—the loss—can also be a discriminator which, similar to the classifiers described above, is formed by a discriminative neural network.

When a generative neural network is used as a model-based sample generator in combination with a discriminator, i.e. with a discriminative neural network, the output data record generated by the model-based sample generator can be supplied to the discriminator as an input data record. The discriminator is typically trained with training data records that represent the object for which the model-based sample generator was also trained. The discriminator can thus determine, in the sense of a binary classifier, for a respective output data record generated by the model-based sample generator whether this output data record actually represents the corresponding object or not. This kind of combination of a generative neural network and a discriminative neural network is also known as GAN (Generative Adversarial Network) and described, for example, in Andreas Wiegand "An Introduction to Generative Adversarial Network (GAN)", Seminar AI: yesterday, today, tomorrow Applied Computer Science, University of Bamberg.

The model-based sample generator can also be an autoencoder that has been trained by means of a similarity loss function or a root mean square error (RMSE) function as the instance determining the deviation.

According to the idea upon which the invention is based, the model-based sample generator of the system according to the invention serves to determine for which input data records the classifier can supply meaningful output values. If the classifier is not a binary classifier but a multi-class classifier whose discriminative artificial neural network implements several classification models representing different classes, each of which was generated with different training data records, then a model-based sample generator is provided for each classification model, with such model-based sample generator having been generated with the training data records for the respective classification model and also only being able to provide statements for the corresponding classification model.

By using the trained generator, an artificial data record representative of the classification model can be generated for a class, which data record is also referred to as an artificial prototype in the context of this description. This is done by supplying an input data record that represents noise—i.e. that is formed by random values—to the model-based sample generator in a known manner.

Preferably, various input data records representing noise are supplied to the model-based sample generator and different prototypes are generated this way.

Technical properties can then be derived from the prototype or the different prototypes, which should be at least approximately fulfilled by the input data records to be supplied to and classified by the classifier, so that the membership value generated by the classifier for the respective input data record is reliable.

This is possible because both the classification and the model-based sample generator were trained with the same training data records.

If the input data records to be classified represent magnetic resonance tomographies or computer tomographies, for example, these technical properties are e.g. the contrast range in Hounsfield units, the image distance or the reconstructed slice thickness, the imaged volume, etc.

Only if the input data records to be classified are similar to the training data records with regard to these technical properties can a reliable classification result—i.e. a reliable membership value—be expected.

If the training data records for the classifier are not available for direct analysis for technical reasons or for reasons of confidentiality, the technical boundary conditions to be fulfilled by the input data records to be classified, so that a reliable classification is possible, can be determined by means of the model-based sample generator, because these technical properties can be read on the artificially generated data record that is representative of the classification model (the prototype).

In the event that different prototypes were generated by the model-based sample generator by means of different input data records representing noise, these different prototypes can be used to define a value space for the parameter values that the technical properties of the input data records to be classified have to fulfill so that the classifier can form reliable membership values. Parameters whose (parameter) values are relevant are, for example, the contrast range, the image distance, the reconstructed slice thickness, the reconstructed volume, or the like, that form the basis for a respective tomography or image represented by an input data record.

The artificially generated prototypes, which are based on different parameter values, can be checked by means of a loss function and/or a similarity function and/or a similar metric to determine whether the respective artificially generated prototype (and thus the parameter values upon which it is based) can be expected to produce reliable classification results. The respective loss function provides a measure of the reliability with which a classifier correctly classifies an input data record. By classifying the prototypes artificially generated by means of the generative neural network and generating the associated loss function, suitable artificial prototypes, which can be expected to produce a reliable classification result, can be determined. The parameter values upon which the artificial prototypes providing reliable classification results are based define a value space for the parameter values of the relevant parameters (e.g. image resolution) within which reliable classification results can be expected.

A model-based sample generator that has been trained with training data records that provide reliable classification results can, in particular, also be used to check input data records based on real recordings, images or tomographs to determine whether the input data records can be expected to provide a reliable classification result from the corresponding classifter. For this purpose, an artificial prototype generated by the model-based sample generator can be compared with the respective input data record by means of a suitable metric, e.g. by using a loss function. A low loss then indicates that the input data record can be expected to provide a reliable classification by the model-based sample generator.

The comparison of input data records based on real data with artificial prototypes generated by the model-based sample generator can be used to define (parameter) value spaces that contain parameter values and combinations of parameter values leading to input data records that can probably be reliably classified. For this purpose, different input data records based on real data, each of which is based on different parameter values, must be compared with the artificially generated prototypes in order to determine the parameter values and combinations of parameter values that lead to a low loss.

A parameter space thus determined can be made available to the operator of the classifier so that the operator can check the quality of the input data before a classification is performed by the classifier. Only those input data records, for which the data with parameter values and value combinations that are within the parameter space has been obtained, fulfill the quality criterion. "Obtaining data with parameter values and value combinations" means in this context that, when the data is generated by a data-generating entity, for example a tomograph, parameter values, such as resolution, slice thickness, etc., prevail that affect the data generation and thus the generated data.

Instead of operating the model-based sample generator, as outlined above, independently of the input data records to be specifically classified so that a parameter value space can be created, the model-based sample generator can also be connected upstream of the classifier—and thus possibly be part of a confidential environment.

In this case, an input data record to be specifically classified by the classifier can first be compared with a corresponding artificial prototype generated by the model-based sample generator in order to obtain an estimation with regard to the reliability of the classification prior to classification.

In this solution, the model-based sample generator is part of the confidential environment.

However, in the variant described above, in which a parameter value space that is expected to provide reliable classification results, the model-based sample generator can also be operated outside of a confidential environment. In particular, several model-based sample generators can be operated in their separate containers on one or more servers. Since the model-based sample generators are operated in (software) containers, i.e. in a logically closed area of a server, the model-based sample generators can also be part of a quasi-confidential area in which the respective classifier is also operated. For example, a model-based sample generator operated in a container can be connected to the respective classifier and/or the confidential environment, in which the respective classifier is operated, via a VPN connection (VPN: Virtual Private Network).

A maximum value is specified for the respective loss function used; an artificially generated prototype must not exceed this value in order to be considered reliable.

Conversely (and correspondingly) the check can also be carried out by means of a similarity function that provides a similarity measure for a respective artificial prototype. For the similarity measure, a minimum value may be specified that must not be fallen short of in order for the associated artificial prototype to be considered reliable.

The (parameter) value space determined in accordance with the variant first outlined above is a quality criterion that can be used as the basis for checking input data records to be classified. Input data records to be classified that meet the quality criterion, because the values of technical parameters represented by the input data records to be classified fall within the value space or value range according to the quality criterion, result in a reliable classification result.

In addition, a method is proposed for determining a quality criterion for input data records for a classifier with a discriminative neural network. The input data records depend on values of technical parameters that are represented in the input data records, and the quality criterion relates to at least one value of one of these technical parameters. The classifier has been trained with training data records and represents a classification model for a class.

According to the method, a model-based sample generator with a generative neural network is initially provided and trained with the same training data records that were used to train the classifier.

Subsequently, by means of the trained model-based sample generator and an input data record based on random values, an artificial data record is generated, which is representative of the classification model embodied by the classifier and represents an artificial prototype.

Values for technical parameters represented by this artificial prototype are then determined from the artificial data record—i.e. the artificial prototype.

A quality criterion is formed from the determined values of the technical parameters by using the determined values of the technical parameters to specify a value space or value range that is dependent upon the determined values of the technical parameters and a specified tolerance range, wherein the classifier delivers a reliable classification result for such input data records representing the values of technical parameters that fall within the value space and thus fulfill the quality criterion.

Preferably, a respective associated loss function is formed for input data records based on different values of the parameters and an artificial prototype generated by the model-based sample generator, and a respective output value supplied by the loss function is compared with a specified reference value. In the event that a respective loss function is smaller than the specified reference value, the parameter values, upon which the respective input data record is based, are classified as those which provide a sufficiently reliable classification result. By determining the output values of the loss function for different input data records that are based on different values of the parameters and comparing the respective output value of the loss function with the specified reference value, a value space can be formed for the values of the parameters, which value space creates a quality criterion for the parameter values, namely in such a way that parameter values within the value space fulfill the quality criterion.

Alternatively, each input data record to be specifically processed by the classifier or the regressor can be compared with the artificial data record generated by the model-based sample generator in order to determine the loss compared to or the similarity to the artificial data record generated by the model-based sample generator and to thereby obtain an estimate regarding the reliability of the classification prior to or in parallel with the classification of the input data record.

For this purpose, an instance determining the deviations between the prototype and the respective input data record (e.g. a discriminator or a similarity loss function) can be connected upstream from or parallel to the classifier and, for an input data record to be specifically classified, the loss compared to a prototype generated by the model-based sample generator can be determined in order to obtain an estimate regarding the reliability of the classification even prior to or in parallel with the classification of the input data record.

In the simplest case, it will thus suffice if an instance determining a deviation, such as a discriminator or a similarity function in combination with a prototype generated by the model-based sample generator, is connected upstream or in parallel to the classifier in order to determine a loss as compared to or a similarity with the prototype for each input data record to be specifically classified.

The input data records to be classified preferably represent tomographic images, and the technical parameters, the values of which are determined from the artificially generated data record, are preferably the contrast range, the image distance, the reconstructed slice thickness, the reconstructed volume, or a combination of these.

It is also preferred if, by means of the trained model-based sample generator and several different input data records based on random values, several artificial data records are generated that are representative of the classification model represented by the classifier, and values for technical parameters represented by these artificial data records are determined from the artificial data records.

The invention will now be explained in more detail using an exemplary embodiment and referencing the figures. The figures show the following.

Figure 1:
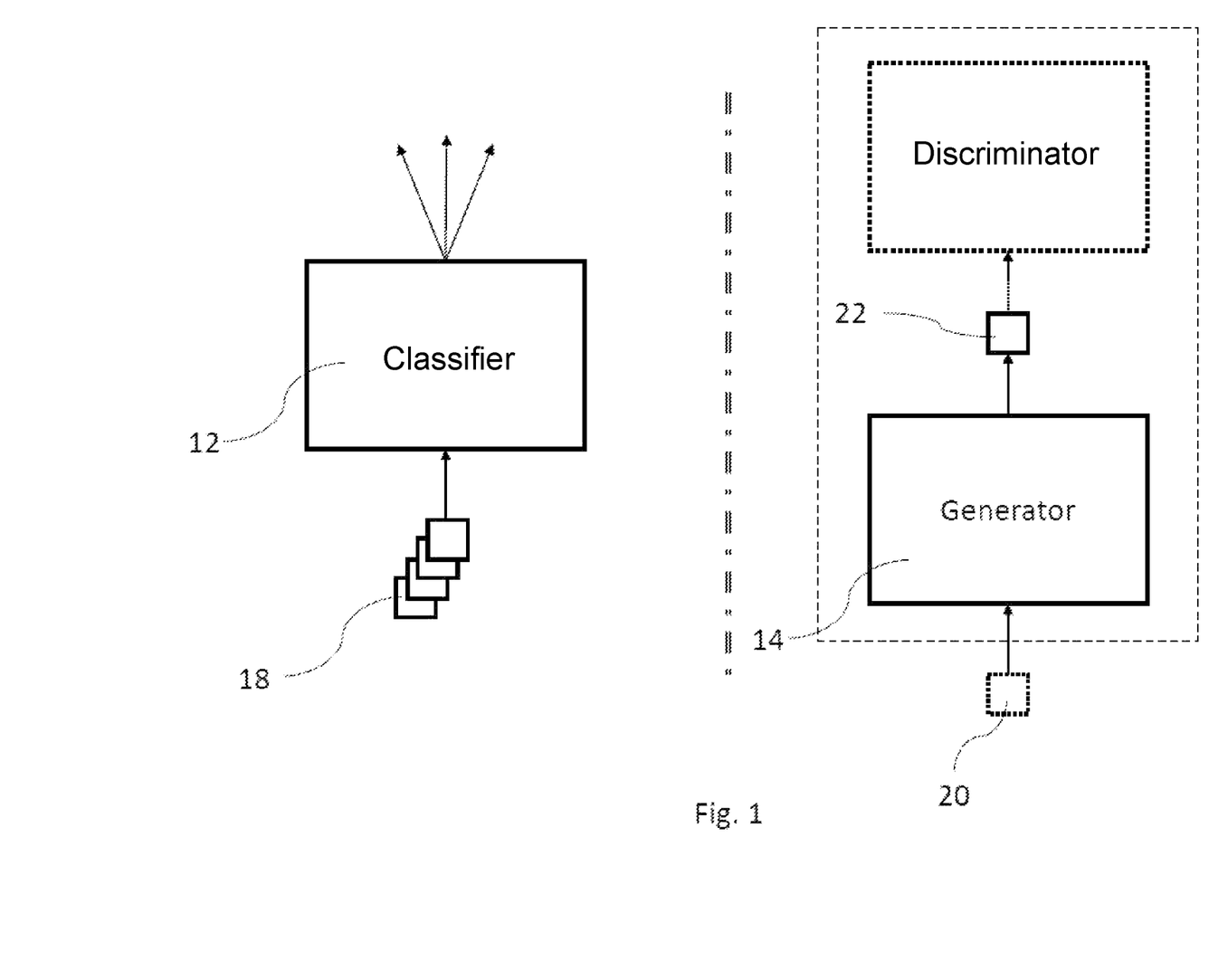
FIG. 1: A system according to the invention with a classifier and a model-based sample generator independent of the classifier for generating a prototype.

FIG. 1 is a diagram of a system 10 that, on the one hand, comprises a classifier 12 and, on the other hand, a model-based sample generator 14. A regressor 28 can also be provided instead of the classifier 12.

In the case of a classifier, it can be trained, for example by means of training data records representing healthy anatomical structures, to recognize healthy anatomical structures and to assign a high membership value (i.e. a low loss) to them, thereby differentiating them from data records representing pathological anatomical structures, because such data records representing pathological anatomical structures have a lower degree of similarity with the training data records—and thus with the model embodied by the classifier.

The classifier 12 is formed by a trained discriminative artificial neural network that represents a one-class model or a multi-class model. Accordingly, the classifier 12 is either a binary classifier or a multi-class classifier. The classifier 12 has been trained by means of corresponding training data records for a respective class. As described at the beginning, it is dependent upon the training data records how the classifier behaves for the respective class.

Figure 2:
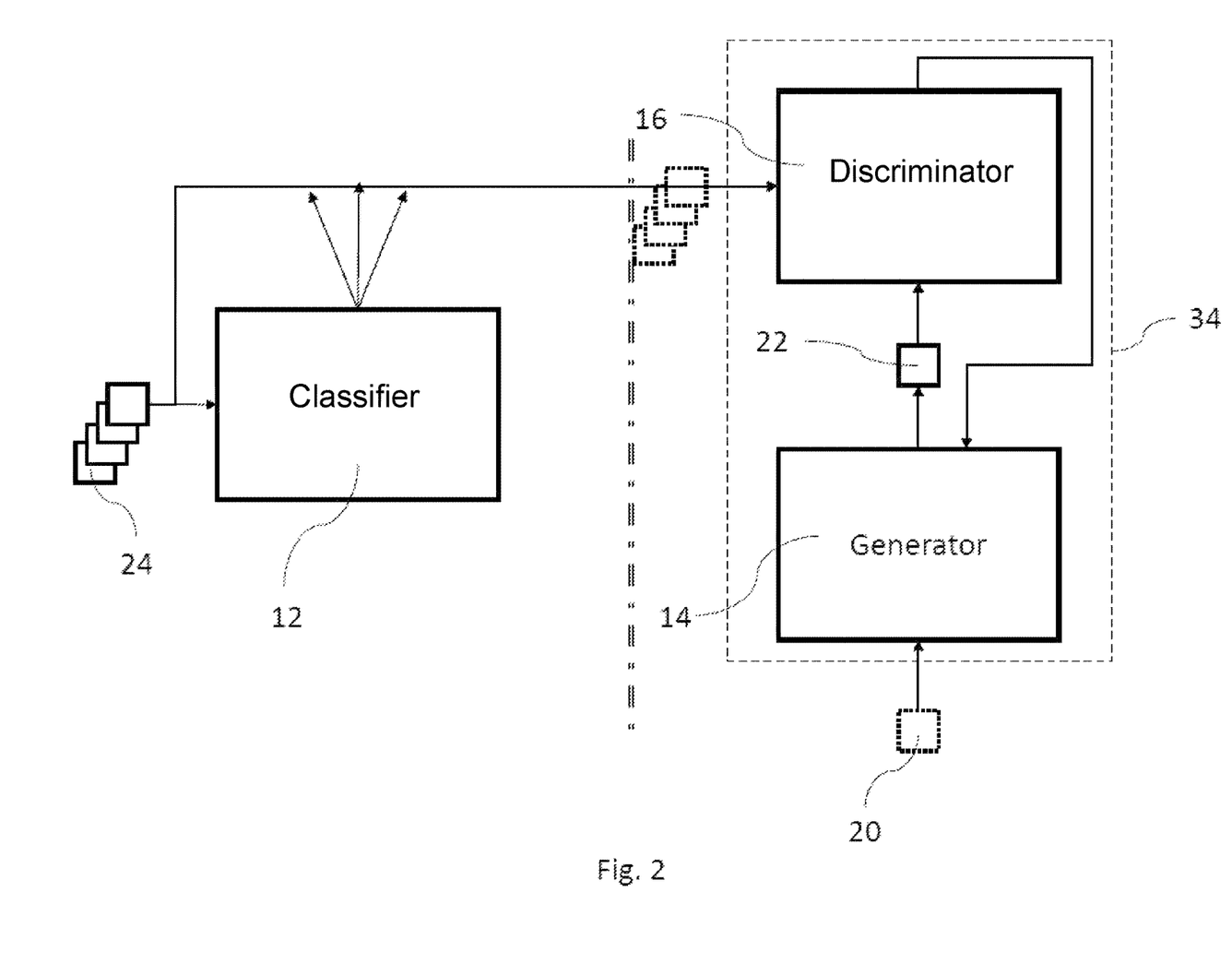
FIG. 2: A diagram for explaining the training phase.

If input data records 18, which represent objects, states or events to be classified, are supplied to the classifier during operation, the classification result depends on the training data records 24 that were used to train the classifier 12 (cf. FIG. 2).

As already explained above, each value from an input data record 18 is supplied to the nodes of an input layer of the discriminative neural network of the classifier 12 during operation. The output values of the nodes of the input layer are then passed on to the nodes of the subsequent hidden layers until, finally, the nodes of the output layer generate a signal representing a membership value that indicates how much the input data record—and thus the object, state or event represented by the input data record—is to be assigned to one of the classes for which the classifier 12 was trained.

The discriminative artificial neural network of the classifier 12 can, for example, be a perceptron but also a Convolutional Neural Network (CNN) with one or more convolution layers at the input. In the case of the perceptron, the input data record is typically a vector of the type described at the beginning. In the case of a Convolutional Neural Network (CNN), the input data record is typically a matrix which, in most cases, represents an image.

The problem is that, for a user of a classifier such as the classifier 12, it is typically not easy to determine whether or not he can trust the respective classification result—that means, the membership values supplied by the classifier. In particular, the user does not know for which input data records the classifier 12 will predictably deliver reliable results and for which input data records the classifier 12 will predictably not deliver reliable results.

This is because the classification result is not only dependent upon the content represented by a respective input data record (for example an image of an anatomical structure), but also upon the technical parameters of the data record, e.g. resolution and contrast. For example, a classifier 12 trained with training data records representing healthy anatomical structures can falsely classify an input data record also representing healthy anatomical structures as a data record representing pathological structures if the input data record representing healthy anatomical structures deviates more from the training data records because of technical reasons, e.g. insufficient triggering. In addition, the classification result may also depend upon the completeness or correctness of the respective input data record. An input data record can, for example, consist of a matrix representing an image and additional parameter values (e.g. modality, age of the patient, etc.). If the input data record is incomplete, i.e. if, for example, additional parameter values are missing or completely incorrect (e.g. a negative age), the input data record is unsuitable for reliable classification.

The model-based sample generator 14 is provided in order to determine the limits within which the classifier 12 can deliver reliable and dependable results. The model-based sample generator 14 is formed by a generative artificial neural network that has been trained with training data records for the class or one of the classes that were also used to train the classifier 12 for the corresponding class. However, the training data records as such are not available to the user of the model-based sample generator, meaning that the training data records that were used to train the classifier 12 and also the model-based sample generator 14 can remain anonymous to external parties. It is thus not possible to infer directly from the training data records under which conditions or prerequisites the classifier 12 will likely deliver reliable results.

However, since the model-based sample generator 14 has been trained for a class with the same training data records as the classifier 12 for this class, it is possible to generate an artificial data record with the model-based sample generator 14 from a random input data record that typically represents noise. The artificial data record thus generated represents a type of artificial prototype for an object, a state, or an event that defines the corresponding class for which the classifier 12 was also trained. By looking at the artificial prototype it can now be determined what the object, state or event looks like, for which the classifier was trained for the corresponding class. For objects, states or events that deviate greatly from the artificial prototype, the classifier 12 will typically not provide a high membership value for the corresponding class, even if these deviating objects, events, or states were to be assigned to the corresponding class.

It should be noted here that deviating data records can already result from the method used to generate the (input) data record representing a corresponding object, a corresponding state, or a corresponding event. This means that the differences in the input data records depend not only upon the represented object, the represented state, or the represented event, but also upon the method (i.e. with which means or which settings or under which circumstances) used to generate the corresponding data record for such an object, event or state. For example, the data records can simply differ in the resolution with which a corresponding object, a corresponding event or a corresponding state is represented by the data record. Different resolutions can lead to different classification results. This can be estimated by means of the prototype artificially generated by the model-based sample generator 14.

It is an advantage that the classifier 12 or the regressor 28 can be part of a confidential environment, for example in a hospital with confidential patient data, while the model-based sample generator does not need to be because it can be trained with anonymized training data records (namely the same ones used to train the classifier or the regressor) and can deliver a product criterion as a result, which can then be used in the confidential environment in the classifier or regressor environment to check real input data records.

FIG. 2 illustrates that the classifier 12 (or the regressor 28) and the model-based sample generator 14 were trained with the same training data records. The training data records as such are invisible to the operator of the model-based sample generator 14, so that confidentiality can also be maintained in this respect.

In the example shown in FIG. 2, the model-based sample generator 14 is part of a Generative Adversarial Network 34 (GAN) that is formed by the model-based sample generator 14 and an associated discriminator 16. To train the model-based sample generator 14 with the training data records that are supplied to the discriminator 16, the model-based sample generator 14 generates an artificial (generated) data record from an input data record 20 representing noise and thus a data record 22 representing an artificial prototype which is supplied to the discriminator 16 as an input data record. The discriminator 16 can determine the deviation between the artificial prototype and the model defined by the training data records—the loss—and generate an output signal representing this deviation. During training, the output signal of the discriminator 16 representing the loss is sent back to the model-based sample generator 14 where it triggers an adjustment of the weights of the nodes of the layers of the model-based sample generator 14. This continues until the deviation between the artificial prototype 22 and the model represented by the training data records 24 is sufficiently small. As soon as this is the case, the model-based sample generator 14 has been trained for the corresponding class. The discriminator 16 is no longer required for the analysis described in connection with FIG. 1.

Known functions for determining the loss (loss functions) are the cross-entropy function, the root mean square function (RMS), or the structural similarity index function (SSIM).

or the model-based sample generator 14 to be suitable for creating an artificial prototype that not only represents healthy anatomical structures, but also represents pathological anatomical structures, the training data records contain, for example, both data records that represent healthy anatomical structures and data records that represent pathological anatomical structures. In this case, the properties of the prototype are characterized by the more general common properties of the training data records, i.e in particular also by their technical properties. A similarity of input data records to be classified for the classifier 12 or the regressor 28 with an artificial prototype generated as described therefore indicates a technical suitability of the input data records for reliable classification or regression. A strong deviation of an input data record to be classified by the classifier 12 from the artificial prototype 22 is an indication of an insufficient suitability for reliable classification.

After the training, the model-based sample generator 14 can then be used as follows to determine a quality criterion for input data records to be classified for the classifier:

First, a model-based sample generator 14 with a generative neural network is provided and trained with the same training data records that were used to train the classifier 14.

Subsequently, by means of the trained model-based sample generator 14 and an input data record based on random values, an artificial data record 22 is generated, which is representative of the classification model embodied by the classifier and which is also referred to as an artificial prototype 22 within the scope of this description.

According to a first approach, values for technical parameters represented by this artificial data record are determined from the artificial data record 22.

A quality criterion is formed from the determined values of the technical parameters by using the determined values of the technical parameters to specify a value space or value range that is dependent upon the determined values of the technical parameters and a specified tolerance range, wherein the classifier delivers a reliable classification result for such input data records representing the values of technical parameters that fall within the value space and thus fulfill the quality criterion.

Alternatively, the value range or value space serving as a quality criterion can also be determined by comparing a data record artificially generated by the model-based sample generator 14 (i.e. an artificial prototype) with various input data records that are based on real data. To this end, input data records are used that are based on different parameter values for the relevant parameters, such as e.g. resolution, layer thickness, or the like. For each input data record, the loss compared to the artificial prototype 22 or the similarity to the artificial prototype is determined, namely by means of a loss function known per se or a similarity function also known per se. If the comparison shows that the loss is low or the similarity is large enough, the parameter values upon which the respective input data record is based are assigned to the parameter space that represents sufficient quality.

A parameter space can also be formed in this alternative way by means of the model-based sample generator 14, which can serve as a quality criterion for input data records to be classified by the classifier 12—namely in the sense that input data records that are based on data, which data was generated with parameter values from the parameter space serving as a quality criterion, fulfill the quality criterion and can be expected to provide a reliable classification.

According to a third variant, a unit 32 for determining similarity is assigned to the classifier, which unit checks input data records to be processed by the classifier 12 or the regressor 28 for their similarity to the artificial prototype. The unit 32 for determining similarity can be connected upstream of or in parallel to the classifier 12 or the regressor 28—and is thus part of a potentially confidential environment. The unit 32 for determining similarity can, for example, be a discriminator that is configured to determine a loss between a respective input data record to be checked by the classifier 12 or regressor 28 and the artificial prototype 22. The loss can then be determined for an input data record to be specifically classified as compared to an output data record (prototype) generated by the model-based sample ple generator, in order to obtain an estimate of the reliability of the classification before the input data record is classified.

However, the unit 34 for determining similarity can also be configured for a simple comparison of a respective input data record to be checked by the classifier 12 or the regressor 28 with the artificial prototype 22 by means of a similarity function, for example by determining the root mean square error (RMSE), the cross-entropy or the structural similarity index (SSIM) measure. Accordingly, in the simplest case, it will suffice if an instance determining a deviation, such as a discriminator or a similarity function in combination with an output data record, which was generated by the model-based sample generator and represents an artificial prototype, is connected upstream of or in parallel to the classifier (or the regressor) in order to determine a loss as compared to or a similarity with the prototype for each input data record to be specifically classified. If a loss is determined, it should be as small as possible (e.g. close to zero on a scale from 0 to 1). If a similarity is determined, it should be as close as possible to 1 on a scale from 0 to 1. Suitable functions aim to map the distance between two data records—i.e. the input data record and the artificial prototype. In the simplest case, such a function could determine an average difference between the individual elements of the input data record and corresponding elements of the artificial prototype. However, this is disadvantageous because, for example, the direction of the difference is not considered, and outliers are not corrected. A loss function is typically used to optimize a model using an optimizer. If necessary, the scaling is changed for a loss function—so that it corresponds to the mathematical requirements of the optimization algorithm.

The input data records to be classified preferably represent tomographic images, and the technical parameters, the values of which are determined from the artificially generated data record, are preferably the contrast range, the image distance, the reconstructed slice thickness, the reconstructed volume, or a combination of these. Other parameters of an input data record can be data regarding the receiving modality or also regarding a patient. The last-mentioned data would be, for example, gender, age, height, etc.

It is also preferred if, by means of the trained model-based sample generator and several different input data records based on random values, several artificial data records are generated that are representative of the classification model represented by the classifier, and values for technical parameters represented by these artificial data records are determined from the artificial data records.

By means of the method and the system, the problem is solved that it is difficult for an operator of a classifier to recognize whether he is relying on classification results obtained from the classifier—i.e. membership values generated by the classifier. The latter is only the case if the input data records to be classified fulfill technical criteria for the classifier that match the classification model represented by the classifier. Such technical criteria are the value ranges of the technical parameters that are represented by the respective input data record. The classification by the classifier is only reliable if these match the classification model.

Figure 3:
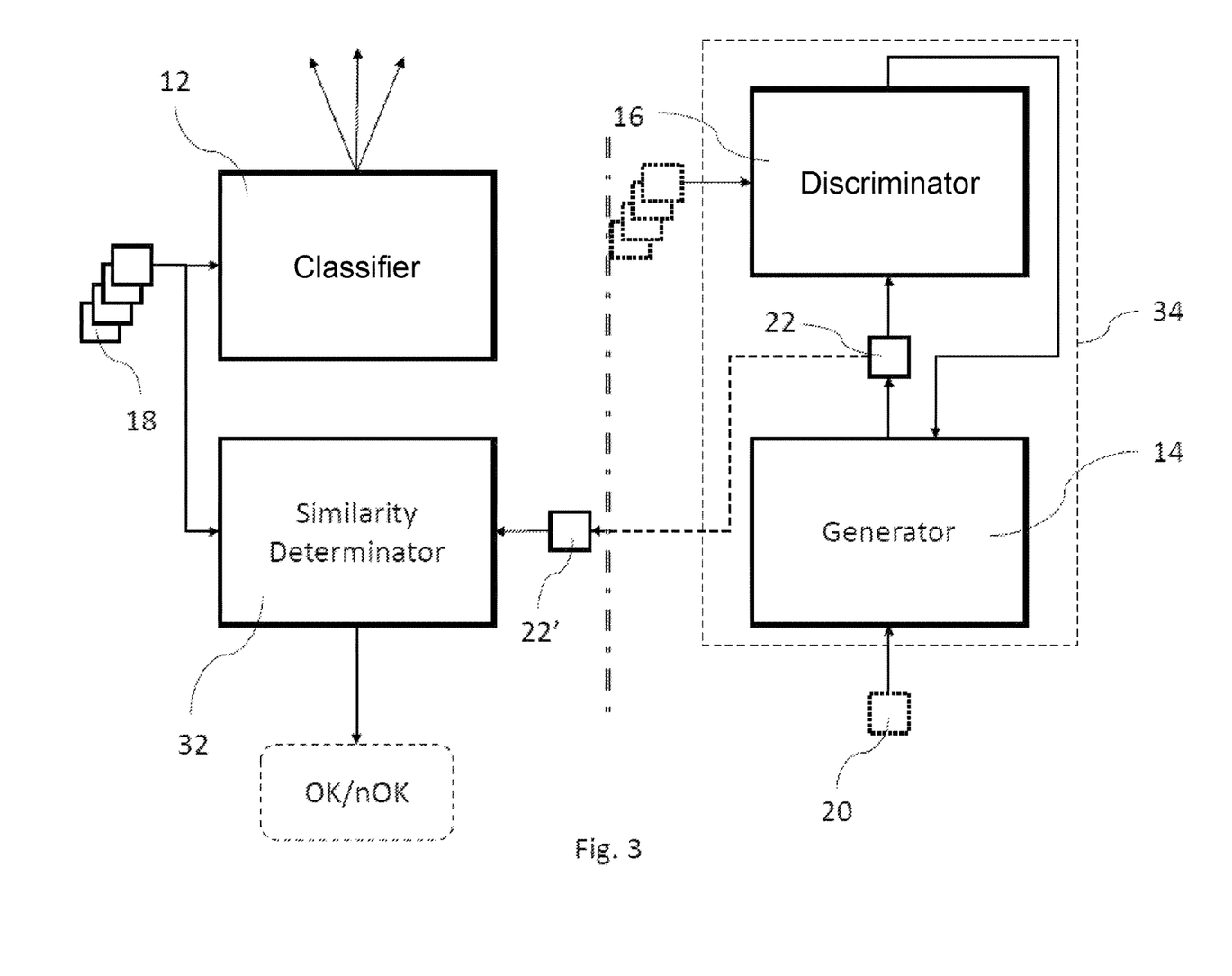
FIG. 3: A diagram of a possible implementation of a quality test in a confidential environment.

As already mentioned above, a quality test of input data records 18 to be classified can also be performed in such a way that the classifier 12 is operated in the confidential environment in combination with a (second) discriminator 26. FIG. 3 illustrates a corresponding configuration. The confidential environment with the classifier 12 and the (second) discriminator 26 are shown on the left side in FIG. 3. The second discriminator 26 is used to determine a loss function, i.e. to determine a measure of an (averaged) deviation between an artificial prototype 22' generated by the model-based sample generator 14 and an input data record 18 to be classified in each case. The artificial prototype 22' can be generated in the non-confidential environment by the model-based sample generator 14 and then made available for the quality test in the confidential environment. In fact, the second discriminator 26 can also be regarded as a classifier trained with the artificial prototype 22' that determines a membership to a class "suitable for reliable classification (O.K.)" or to a class "not suitable for reliable classification (n.O.K.)" for each input data record 18 to be classified. The second discriminator 26 can thus be configured as a binary classifier. The actual classifier 12, on the other hand, is typically a multi-class classifier and classifies the input data records 18 by assigning each input data record 18 to one of several classes for which the classifier 12 was trained.

Figure 4:
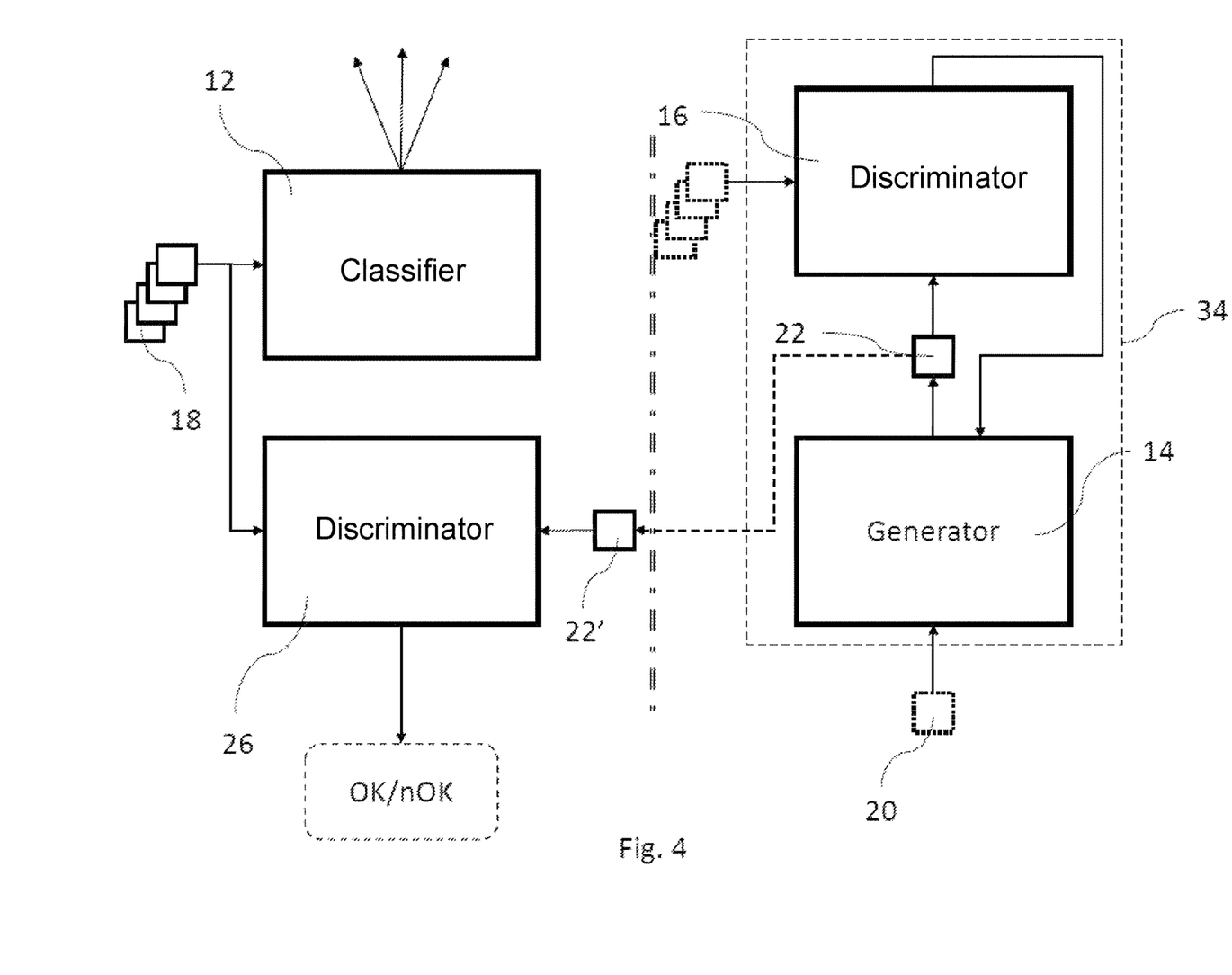
FIG. 4: A diagram of an alternative implementation of a quality test in a confidential environment.

In the exemplary embodiment shown in FIG. 4, the discriminator 26 is an instance that checks the deviation between the artificially generated prototype 22' and an input data record 18 to be classified in each case. The discriminator 26 can thus also represent a simple similarity loss function.

Figure 5:
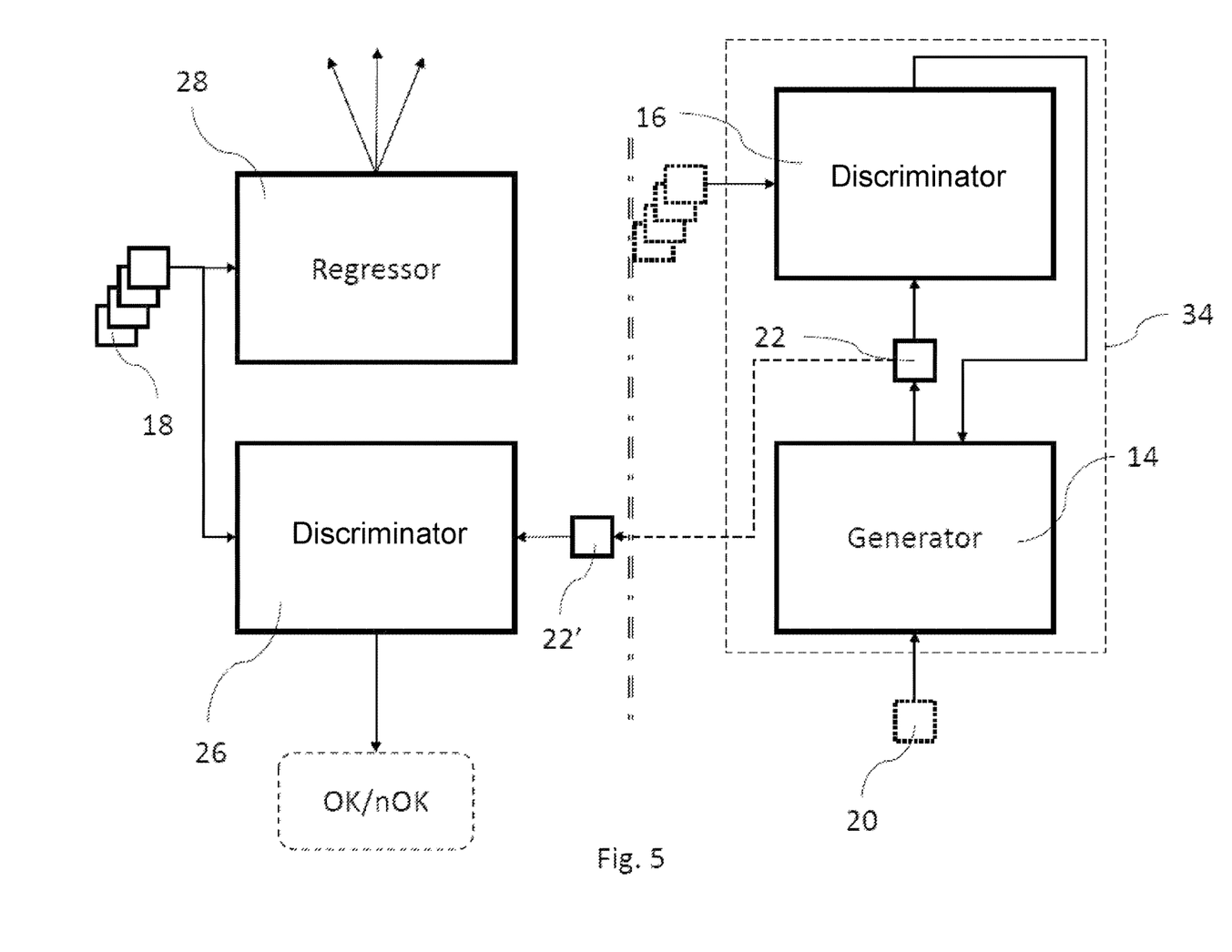
FIG. 5: A diagram of an implementation similar to the one shown in FIG. 4, wherein a regressor is provided instead of a classifier.

As also mentioned above, a regressor 28 can also be provided instead of a classifier in the confidential environment. This is illustrated in FIG. 5. A regressor typically does not provide an assignment to one of several classes as an output value (like the classifier 12 does), but rather provides a numeric value for a respective input data record. For example, the numeric value can represent the age of a person if the input data record checked by the regressor 28 represents an image of this person. Other numeric values supplied by a regressor can, for example, indicate the probable length of stay of a patient in the hospital. The regressor 28 also embodies a discriminative neural network that has been trained with corresponding training data records, which represent images of people of different ages, for example.

Figure 6:
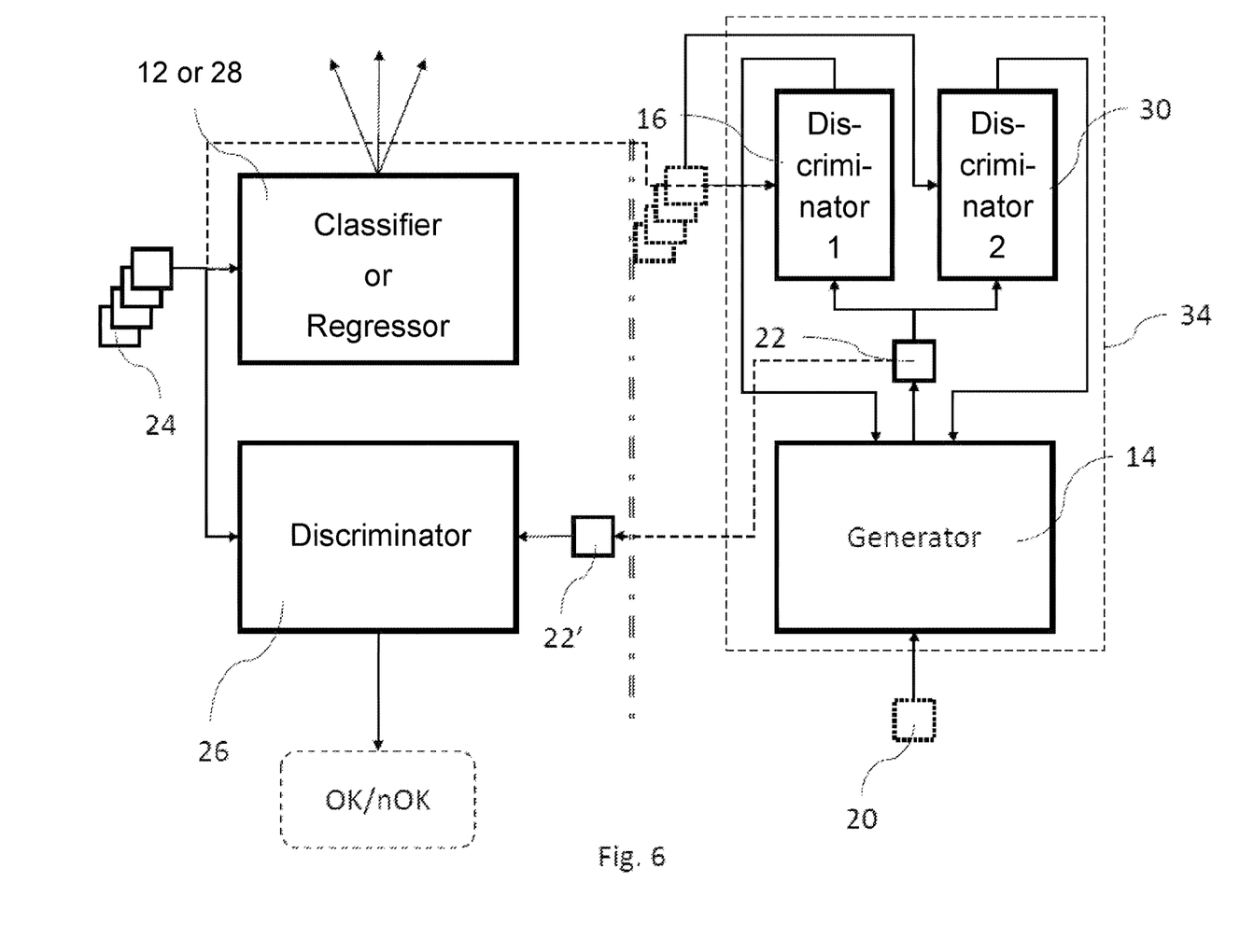
FIG. 6: An illustration of a system with a model-based sample generator for generating a prototype that is connected to two different discriminators for training.

FIG. 6 illustrates an exemplary embodiment in which the GAN 34 features two discriminators 16 and 30 for training the model-based sample generator 14. Of these two discriminators 16 and 30, the first discriminator 16 of the GAN is configured as usual in such a way that its feedback to the model-based sample generator 14 results in the loss between the training data records and the output data 22 generated by the model-based sample generator 14 that iteratively change during the training is minimized by the weights of the generative neural network embodied by the model-based sample generator 14 being adapted during the training. The first discriminator 16 of the GAN 34 is thus configured to determine the loss between the artificially generated data record 22 and the training data records in a manner known per se, and to minimize it in the course of the training.

The second discriminator 30 of the GAN 34 is configured in such a way that, for each prototype 22 generated by the model-based sample generator 14 during the training, it determines its similarity to each of the training data records and, in conjunction with the model-based sample generator 14, works to ensure that a specified minimum number of training data records has a specified minimum similarity with the respectively generated prototype 22, in order to thus prevent the prototype from having a particularly strong similarity to only one or very few training data records. In particular, the second discriminator 30 of the GAN 34 is configured in such a way that it always generates a high value to be added to the loss determined by the first discriminator 16 if fewer than a specified number of training data records result in a similarity measure that is lower than a specified maximum deviation from the best occurring similarity measure. The value determined by the second discriminator 30 for the similarity cluster measure is only small if a sufficient number of training data records has a similarly strong similarity to the artificially generated data record 22, like the most similar training data record.

During training, the sum of the measure for the loss (the loss measure that the first discriminator 16 generates) and the value for the similarity cluster measure determined by the second discriminator 30 is minimized. Since the similarity cluster measure severely "penalizes" a deviation from the specified minimum number of most similar training data records, it is ensured that this specification is typically fulfilled. For example, in the case of twenty training data records, 20 similarity values (values of the similarity measure) are also generated. If, for example, 3 is selected as the limit value (minimum size of the cluster with the best similarity values within a given range), a cluster with the highest similarity measure (the height expresses an increased similarity between the elements) must contain at least three elements. If this cluster is not achieved, negative feedback is given to the model-based sample generator 14.

In the exemplary embodiment shown in FIG. 6, the GAN 34 is configured in such a way that the result during training is at least approximately an optimum with regard to the loss determined by the discriminator 16 and the similarity criterion determined by the discriminator 30.

With regard to all of the illustrated exemplary embodiments, a variant can also be provided in which the output data record 22 generated by the model-based sample generator 14 is a pair of prototypical input data (e.g. an artificially generated tomography) and the associated label. The label designates one of the classes for which the classifier 12 has been trained and for which the artificially generated prototype is intended to be a prototype.

Figure 7:
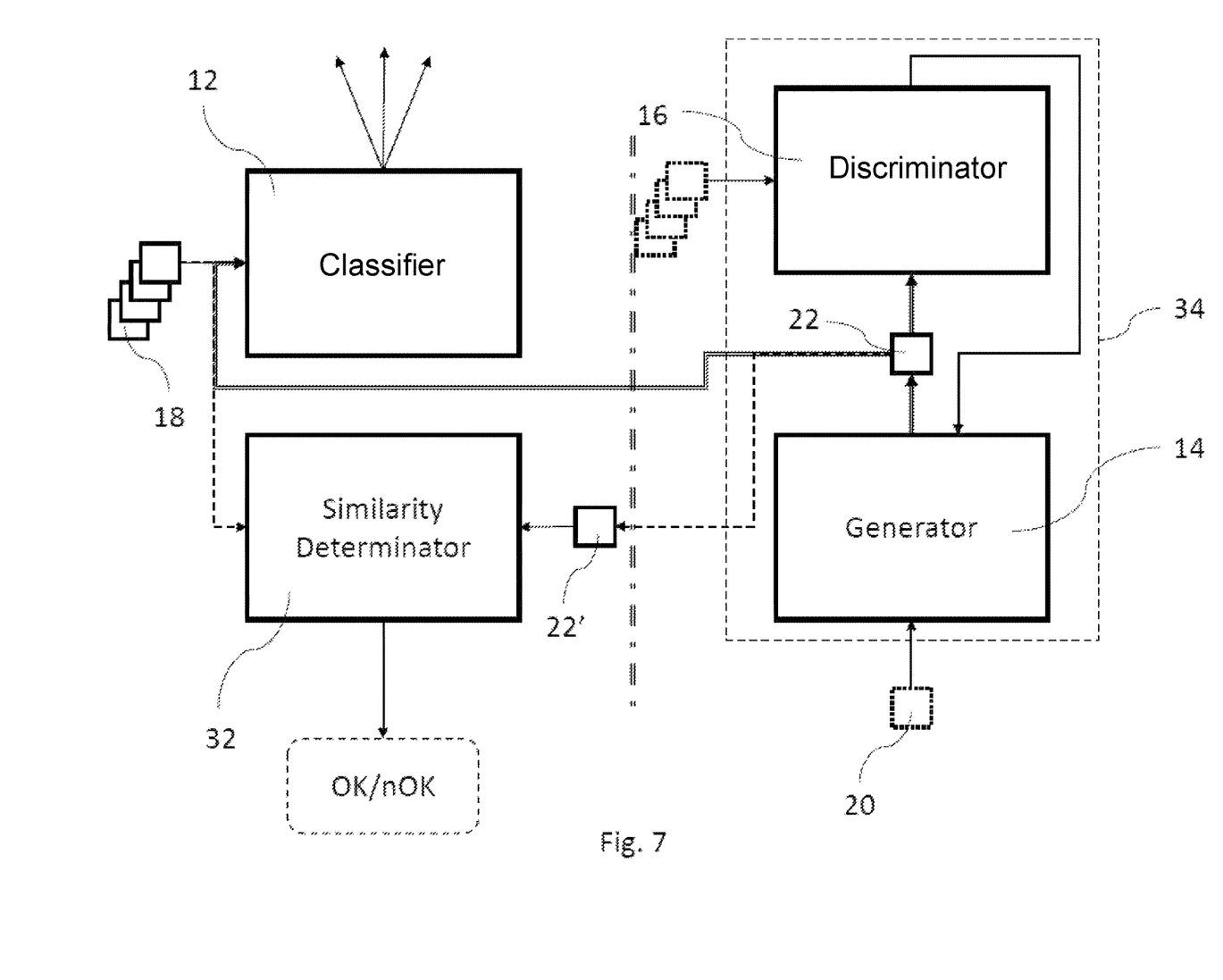
FIG. 7: An illustration of an embodiment in which the model-based sample generator generates a pair from a prototypical input data record and the associated class that can be used to test the classifier.

Such a pair consisting of prototypical input data record and associated label (i.e. associated class) generated by the model-based sample generator 14 can be used for testing the classifier 12 in that the artificially generated, prototypical input data record 22' is supplied to the classifier 12 and the class determined for it by the classifier is compared with the label. The class determined by the classifier 12 for the artificially generated, prototypical input data record 22' must be identical to the label if the system is to be classified as reliable. FIG. 7 illustrates this using an example analogous to the exemplary embodiment shown in 3. However, the concept can also be transferred to all other exemplary embodiments. In FIG. 7, a double line indicates that the output data record 22 generated by the model-based sample generator 14 is a pair consisting of a prototypical input data record and an associated label (i.e. an associated class).

Testing of the classifier 12 by means of a pair consisting of a prototypical input data record and the associated label generated by the model-based sample generator 14 is particularly helpful if the classifier is retrained during operation (e.g. via online training). In this case, the pair consisting of prototypical input data record and associated label generated by the model-based sample generator 14 can be used to test whether retraining was successful. If the retrained classifier 12 performs misclassifications of the pair consisting of prototypical input data record generated by the generator 14, the classifier 12 can be reconfigured back to the classification model prevailing prior to retraining. For this purpose, it is advantageous if log data records (log files) are created during the retraining, in which the modifications made to the classification model during retraining are recorded so that these modifications can be reversed, if necessary.

The preferred embodiments offer the advantage that they also permit federated training of the classifier 12 or regressor 28 and also of the GAN 34. In federated learning, different trained generative neural networks (i.e. generative models) to be embodied by the model-based sample generator 14 are generated by different GANs that can also be located at different locations. The generative neural networks generated in a decentral—and thus federated—manner (more specifically, the models represented by the generative neural networks, which are primarily characterized by the weights in the nodes of the network) can be combined into a single model (and thus one single generative neural network) that is then implemented by the model-based sample generator (34).

Instead of federated learning, the model-based sample generator (14) can also be trained with training data records from different sources (via data pooling) in order to avoid overfitting to a single source.

REFERENCE NUMBERS

12 Classifier
14 Model-based sample generator
16 Discriminator, which is connected to the generator 14
18 Input data records for objects to be classified
20 Input data record
22, 22' Artificial prototype generated by the generator 14
24 Training data records
26 Discriminator in the confidential environment
28 Regressor 30 Second discriminator, which can be connected to the generator 14
32 Unit for determining similarity
34 GAN (Generative Adversarial Network)

The invention claimed is:

1. A System for testing input data records for their suitability for automatic evaluation, in particular classification using a classifier or regressor approximated or trained for one class or several classes, which is created by a first discriminative neural network for classification or regression at a first location, the system having a model-based sample generator with a generative neural network at a second location remote from the first location, wherein the generative neural network of the model-based sample generator has been trained with the same training data records as the discriminative neural network of the classifier or regressor and is configured to generate an artificial output data record from an input data record representing random values, which output data record constitutes a prototype for a model representing the class for which the classifier or the regressor has been trained, wherein the first discriminative neural network is implemented independently of the model-based sample generator and can neither receive data records generated by the model-based sample generator nor deliver data records, which the first discriminative neural network of the classifier or regressor generates during operation, to the model-based sample generator, so that the first discriminative neural network of the classifier or regressor and the model-based sample generator represent instances that are independent of one another.

2. The system according to claim 1, wherein the classifier or the regressor is part of a confidential environment and the model-based sample generator is implemented in a software container and connected to the classifier or the regressor via a VPN connection.

3. The system according to claim 1, wherein a unit for similarity determination is provided at the first location, which unit is configured to test input data records, that are to be supplied to the classifier or regressor for the purpose of classification or regression, by means of the artificial output data record generated by the model-based sample generator with regard to their suitability for classification or regression by comparing a respective input data record with the artificial output data record generated by the model-based sample generator and classifying it as "suitable" or "not suitable".

4. The system according to claim 1, wherein the model-based sample generator is assigned a discriminative neural network that forms a discriminator which, together with the model-based sample generator, forms a Generative Adversarial Network (GAN).

5. The system according to claim 4, wherein the discriminator of the GAN is configured to determine a loss of the artificial output data records generated by the model-based sample generator compared to the training input data records.

6. The system according to claim 4, wherein the model-based sample generator is assigned a second discriminative neural network that forms a second discriminator of the GAN and creates a second measure that is dependent upon the similarity between the training data records and the artificial output data record generated by the model-based sample generator, which measure is also optimized or fulfilled when training the model-based sample generator.

7. The system according to claim 6, wherein the second discriminator assigned to the model-based sample generator is configured in such a way that it always generates a high value to be added to the loss determined by the first discriminator if fewer than a specified number of training data records result in a similarity measure that is lower than a specified maximum deviation from the best occurring similarity measure.

8. The system according to claim 1, wherein the model-based sample generator is configured to generate artificial output data records that contain at least one prototypical input data record for the classifier or the regressor and an associated label in addition to a respective prototypical input data record.

9. A method for determining a quality criterion for input data records for a classifier or a regressor with a discriminative neural network, wherein the input data records are dependent upon values of technical parameters represented in the input data records and the quality criterion pertains to at least one value of one of these technical parameters, and wherein the classifier or the regressor has been trained with training data records and embodies a classification model for a class or a regression model, characterized in that
a model-based sample generator with a generative neural network is trained with the same training data records that were used to train the classifier or the regressor;
that, by means of the trained model-based sample generator and an input data record based on random values, an artificial data record is subsequently generated that is representative of the classification model embodied by the classifier or the regression model represented by the regressor;
that values for technical parameters represented by this artificial data record are determined from the artificial data record;
that a quality criterion is formed from the determined values of the technical parameters in such a way that the determined values of the technical parameters are used to specify a value space that is dependent upon the determined values of the technical parameters and a specified tolerance range, wherein the classifier or regressor delivers a reliable classification result or regression result for such input data records representing the values of technical parameters that fall within the value space and thus fulfill the quality criterion.

10. A method for determining a quality criterion for input data records for a classifier or a regressor with a discriminative neural network, wherein the input data records are dependent upon values of technical parameters represented in the input data records and the quality criterion pertains to at least one value of one of these technical parameters, and wherein the classifier or the regressor has been trained with training data records and embodies a classification model for a class or a regression model, characterized in that
a model-based sample generator with a generative neural network is trained with the same training data records that were used to train the classifier or the regressor;
that, by means of the trained model-based sample generator and an input data record based on random values, an artificial data record is subsequently generated that is representative of the classification model embodied by the classifier or the regression model embodied by the regressor;
that the artificial data record is compared with various input data records that are based on real data and on different parameter values, by determining for each input data record the loss compared to the artificial data record or the similarity to the artificial data record, and, if the comparison shows that the loss is low or the similarity is strong enough, assigning the parameter values upon which the respective input data record is based to the parameter space.

11. A method for testing input data records for a classifier or a regressor with a discriminative neural network, wherein the input data records are dependent upon values of technical parameters represented in the input data records, and the quality criterion pertains to at least one value of one of these technical parameters, and wherein the classifier or the regressor has been trained with training data records and embodies a classification model for a class or a regression model, characterized in that a model-based sample generator with a generative neural network is trained with the same training data records that were used to train the classifier or the regressor;

that, by means of the trained model-based sample generator and an input data record based on random values, an artificial data record is subsequently generated that is representative of the classification model embodied by the classifier or the regression model embodied by the regressor; and that an input data record to be specifically processed by the classifier or the regressor is compared with the artificial data record generated by the model-based sample generator in order to determine the loss compared to or the similarity to the artificial data record generated by the model-based sample generator, and to thereby obtain an estimate regarding the reliability of the classification prior to classification of the input data record.

12. The method according to claim 9, wherein the input data records to be classified represent tomographic images, and the technical parameters, the values of which are determined from the artificially generated data record, are the contrast range, the image distance, the reconstructed slice thickness, the reconstructed volume, or a combination of these.

13. The method according to claim 9, wherein, by means of the trained model-based sample generator and several different input data records based on random values, several artificial data records are generated, which are representative of the classification model embodied by the classifier or the regression model embodied by the regressor; and that values for technical parameters represented by these artificial data records are determined from the artificial data records.

14. The method according to claim 9, wherein the model-based sample generator is trained by means of federated learning.

* * * * *